US007125022B2

(12) United States Patent
Medina

(10) Patent No.: US 7,125,022 B2
(45) Date of Patent: Oct. 24, 2006

(54) COLLAPSIBLE CHAIR

(76) Inventor: Henry Medina, 65 Stratford Rd., Plainview, NY (US) 11803

( * ) Notice: Subject to any disclaimer, the term of this patent is extended or adjusted under 35 U.S.C. 154(b) by 14 days.

(21) Appl. No.: 10/389,181
(22) Filed: Mar. 14, 2003

(65) Prior Publication Data

US 2003/0141677 A1 Jul. 31, 2003

Related U.S. Application Data

(63) Continuation of application No. 09/544,048, filed on Apr. 6, 2000, now Pat. No. 6,561,524.

(51) Int. Cl.
*B62B 5/02* (2006.01)

(52) U.S. Cl. ................................... 280/5.22; 280/250.1

(58) Field of Classification Search ................ 280/650, 280/654, 655, 655.1, 657, 658, 639, 641, 280/642, 645, 646, 647, 250.1, 304.1, 47.2, 280/526, 30, 47.371, 5.2, 5.22, 5.24; 297/DIG. 4; 135/74, 66, 67, 65
See application file for complete search history.

(56) References Cited

U.S. PATENT DOCUMENTS 175,477 A 3/1876 Marble (Continued)

FOREIGN PATENT DOCUMENTS

CA 1 067 443 12/1979

(Continued)

OTHER PUBLICATIONS

Product brochure titled "No facility should be without the AOK Medi-Chair",AOK Medi-Chair, Ltd., Deer Park, New York, U.S.A.

(Continued)

*Primary Examiner*—Hau Phan
(74) *Attorney, Agent, or Firm*—Scully, Scott, Murphy & Presser, P.C.

(57) ABSTRACT

A collapsible chair for transporting people up and down stairs, comprising a main frame, a seating assembly, and a rail assembly. The seating assembly is provided to form a seat for a person, and this assembly is pivotally connected to the main frame for pivotal movement between open and closed positions. The rail assembly is used to support the chair for movement down steps, and this assembly is also pivotally connected to the main frame for pivotal movement between open and closed positions. In accordance with a first aspect of the invention, the chair is provided with uniquely designed gripping bars that may be used to help carry the chair upstairs. Also, the chair is provided with a set of wheels that are uniquely located to help stabilize the chair. Preferably, an improved locking mechanism is mounted on the chair to help lock the seating assembly and the rail assemblies in their open positions, and a specially designed latching assembly is provided to lock an upper frame of the chair in various positions. With the preferred embodiment of the invention, the chair is provided with a harness system to hold a person in the chair, and this system is especially designed to hold the legs of that person so that the person's legs do not interfere with someone carrying the chair upstairs.

13 Claims, 13 Drawing Sheets

U.S. PATENT DOCUMENTS 1,341,470 A 5/1920 Kinnaird
1,949,282 A 2/1934 Murray
2,072,222 A 3/1937 Schuttkus
2,132,069 A 10/1938 Hall
2,214,311 A 9/1940 Stevens
2,362,721 A * 11/1944 Reynolds ................. 280/47.25
2,603,499 A 1/1952 Netzband
2,680,026 A 6/1954 Cushman
2,715,533 A 8/1955 Strausburg
2,883,731 A 4/1959 Wells
2,957,700 A * 10/1960 Beaurline ................ 280/47.19
3,106,980 A 10/1963 Rogneby
3,137,511 A 6/1964 Weil et al.
3,178,193 A 4/1965 Grogan
3,226,128 A 12/1965 Grier, Jr.
3,231,290 A 1/1966 Weyer
3,567,236 A 3/1971 Powers
3,580,591 A 5/1971 Coffey et al.
3,679,257 A 7/1972 Jacuzzi et al.
3,709,556 A 1/1973 Allard et al.
3,990,745 A 11/1976 Rodaway
4,033,595 A 7/1977 Mauch
4,044,850 A 8/1977 Winsor
4,047,724 A 9/1977 Shaffer
4,130,291 A 12/1978 Saethre et al.
4,136,888 A 1/1979 Bowie, Jr. et al.
4,179,012 A 12/1979 Heberle
4,222,449 A 9/1980 Feliz
4,290,625 A * 9/1981 Barriere ...................... 280/654
4,431,076 A 2/1984 Simpson
4,473,234 A 9/1984 Egen
4,556,229 A 12/1985 Bihler et al.
4,566,706 A 1/1986 Bihler et al.
4,570,954 A 2/1986 Mintz
4,585,241 A 4/1986 Misawa et al.
4,688,813 A 8/1987 Misawa et al.
4,691,930 A 9/1987 Samuel
4,786,064 A 11/1988 Baghdasarian
4,805,925 A 2/1989 Haury et al.
4,834,413 A 5/1989 Patel et al.
4,898,256 A 2/1990 Lehner
4,962,941 A 10/1990 Rembos
4,966,392 A 10/1990 Featon et al.
4,989,836 A 2/1991 Hudson, III et al.
5,036,929 A 8/1991 Trougouboff
5,074,574 A 12/1991 Carwin
5,102,195 A 4/1992 Axelson et al.
5,123,495 A 6/1992 Littlejohn et al.
5,127,709 A 7/1992 Rubinstein et al.
5,137,295 A 8/1992 Peek
5,158,309 A 10/1992 Quigg
5,172,715 A 12/1992 Webb
5,181,733 A 1/1993 Tague
5,184,835 A 2/1993 Huang
5,267,745 A 12/1993 Robertson et al.
5,269,544 A 12/1993 Park
5,338,048 A 8/1994 Medina
5,605,169 A 2/1997 Light
5,697,628 A 12/1997 Spear
5,727,802 A 3/1998 Garven, Jr. et al.
6,059,512 A 5/2000 Kielinski
6,561,524 B1 * 5/2003 Medina ..................... 280/5.22

FOREIGN PATENT DOCUMENTS

CA 1 084 861 9/1980
CA 1 223 611 6/1987
GB 1046444 10/1966

OTHER PUBLICATIONS

Product brochure titled “Garaventa Evacu-Trac” (1992) from Garaventa (Canada) Ltd., Surrey, British Columbia.
Product brochure titled “Garaventa Stair-Porter” (1992) from Garaventa (Canada) Ltd., Surrey, British Columbia.
Product brochure titled “Garaventa Stair-Lift” (1991) from Garaventa (Canada) Ltd., Surrey, British Columbia.
Product brochure titled “No facility should be without the AOK Medi-Chair”,AOK Medi-Chair, Ltd., Deer Park, New York, U.S.A..

* cited by examiner

FIG. 11
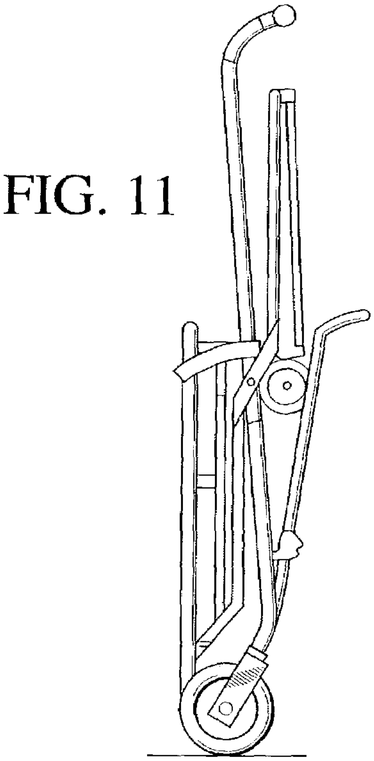
FIG. 12
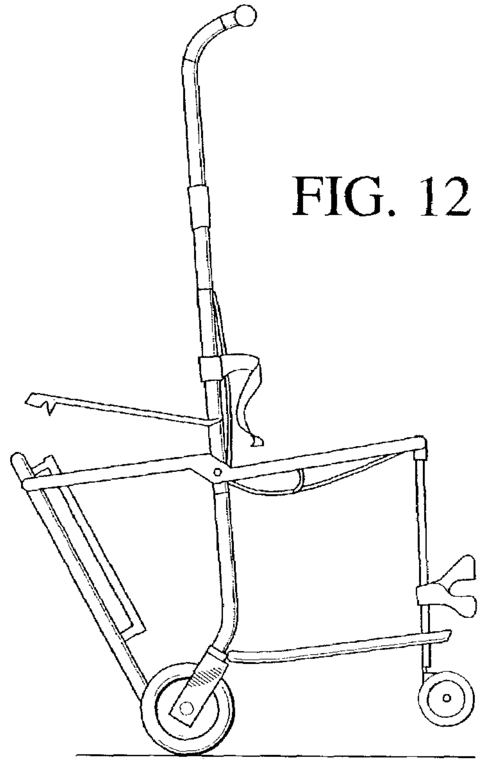
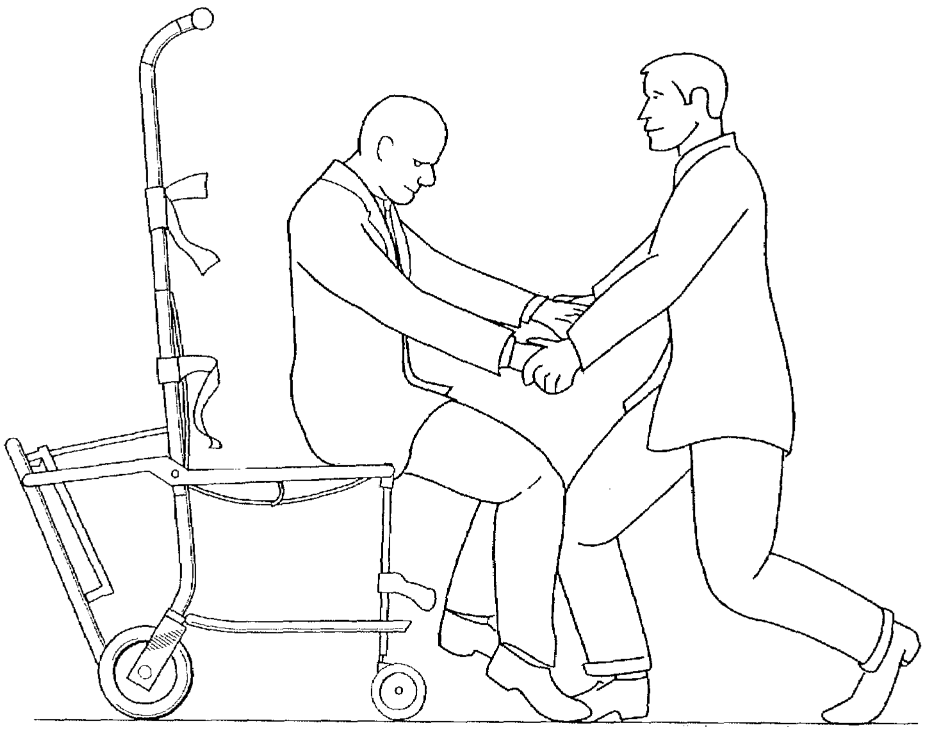
FIG. 13

COLLAPSIBLE CHAIR

CROSS REFERENCE TO RELATED APPLICATIONS

The present application is a continuation of U.S. patent application Ser. No. 09/544,048 filed Apr. 6, 2000, now U.S. Pat. No. 6,561,524.

BACKGROUND OF THE INVENTION

This invention generally relates to collapsible chairs specifically designed to transport people down stairs.

Various types of collapsible chairs are, specifically designed to transport people down stairs. For example, one such chair that is very well designed for this purpose is disclosed in U.S. Pat. No. 5,338,048. Generally, these chairs are particularly useful for evacuating handicapped people from high rise buildings when the elevators cannot or should not be used. These chairs are also useful in helping elderly or disabled people out of their residences.

One limitation of these chairs is that, heretofore, they have not been especially well suited for carrying people upstairs, which is also an important need. For instance, an elderly or disabled person may be returned home from a hospital and require assistance up the stairs into his or her home.

SUMMARY OF THE INVENTION

An object of this invention is to provide a collapsible chair that can readily be used both to transport people upstairs and downstairs.

A further object of the present invention is to provide a collapsible chair, of the type that is well suited for carrying people downstairs, with specially located gripping bars to help people grip the chair and carry the chair upstairs.

Another object of this invention is to provide a well stabilized collapsible chair that is very well suited for transporting people both upstairs and downstairs.

A further object of this invention is to provide an improved locking mechanism with Velcro straps for locking a collapsible chair in an open, erect position.

Another object of the present invention is to provide an improved latching mechanism for holding an upper, collapsible frame of a collapsible chair in various selected positions.

These and other objectives are attained with a collapsible chair for transporting people up and down stairs, comprising a main frame, a seating assembly, and a rail assembly. The seating assembly is provided to form a set for a person, and this assembly is pivotally connected to the main frame for pivotal movement between open and closed positions. The rail assembly is used to support the chair for movement down steps, and this assembly is also pivotally connected to the main frame for pivotal movement between open and closed positions.

In accordance with a first aspect of the invention, the chair is provided with uniquely designed gripping bars that may be used to help carry the chair upstairs. Also, preferably the chair is provided with a set of wheels that are uniquely located to help stabilize the chair. Also, in accordance with the invention, an improved locking mechanism is mounted on the chair to help lock the seating assembly and the rail assemblies in their open positions, and a specially designed latching assembly is provided to lock an upper frame of the chair in various positions. With the preferred embodiment of the invention disclosed herein in detail, the chair is provided with a harness system to hold a person in the chair, and this system is especially designed to hold the legs of that person so that the person's legs do not interfere with someone carrying the chair upstairs.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 11–21 illustrate the operation of the chair.

DETAILED DESCRIPTION OF THE PREFERRED EMBODIMENTS

Figure 1:
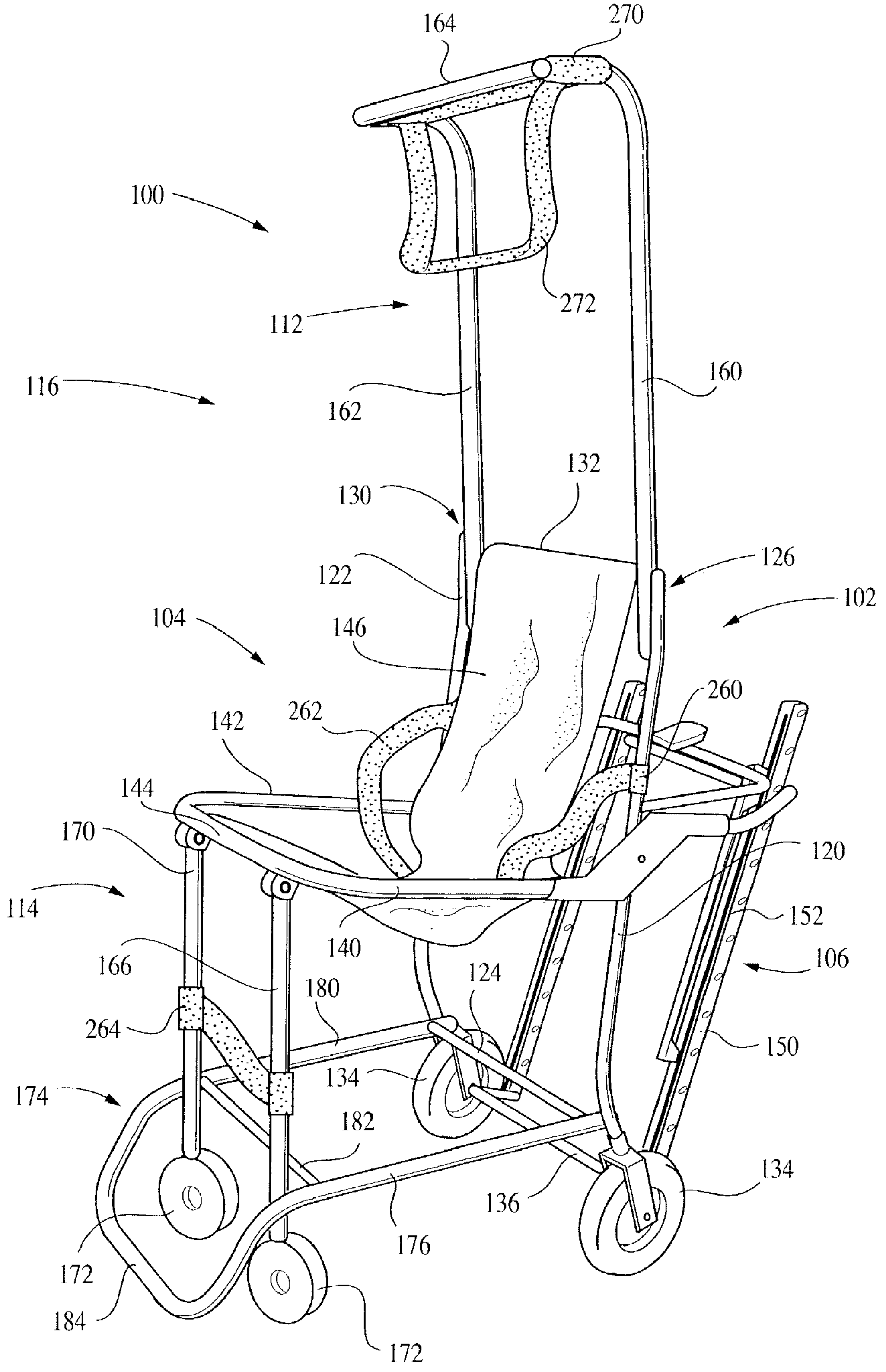
FIG. 1 is a perspective view of a collapsible chair embodying the present invention.

FIG. 1 illustrates collapsible chair 100, generally comprising main frame 102, seating assembly 104, and rail assemblies 106 and 110. Preferably, the chair further includes upper frame section 112, front support assembly 114 and harness system 116. Generally, main frame 102 provides a base or frame for the other components of the chair, and supports the chair for movement over floors and other flat surfaces. Seating assembly 104 is provided to form a seat for a person, and rail assemblies 106 and 110 are provided to support the chair for movement down stairs. Upper frame section 112 provides direct support for the head and upper back of a person seated in the chair. Front support assembly 114 provides additional support for the front of chair 100 and provides a gripping bar 184 to help carry the chair upstairs, and harness system 116 is used to hold a person in the chair.

Chair 100 is similar to the collapsible chair disclosed in U.S. Pat. No. 5,338,048, the disclosure of which is herein incorporated by reference. The elements and components of chair 100 are connected together so that the chair can be expanded from a collapsed form, shown in FIG. 2, to an open form, shown in FIGS. 1, 3 and 4. In its collapsed position, the chair has a small, compact size and shape and, for example, the chair can be stored in a vehicle or closet without occupying a substantial amount of space. When the chair is opened, a person can be safely and securely seated and transported in the chair; and in particular, a person in the chair can be easily transported down stairs and carried up stairs.

With the embodiment of chair 100 shown in FIGS. 1–4, main frame 102 includes left and right support members or legs 120 and 122, lower cross member 124, upper connecting members 126 and 130, upper cross member 132, wheels 134 and lower shaft 136. Seating assembly 104 includes left and right side members 140 and 142, front cross member 144, and flexible sheet 146; and each rail assembly 106, 110 includes rail member 150, a multitude of rollers 152, belt

154 and flange 156. In addition, upper frame section 112 includes left and right side members or legs 160 and 162, and top cross member 164. Also, front support assembly 114 includes legs 166 and 170, wheels 172 and bottom subframe 174; and this subframe, in turn, includes left and right members 176 and 180, and cross or lateral member 182 and carry up gripping bar 184.

Left and right legs 120 and 122 of main frame 102 are generally parallel to each other and generally define the left and right sides of chair 100. Lower cross member 124 is connected to and extends between and supported by lower ends of legs 120 and 122, and upper cross member 132 of the main frame extends between and is supported by upper ends of legs 120 and 122. Wheels 134 are connected to the bottom ends of legs 120 and 122 via suitable brackets. With these connections, frame members 120, 122, 124 and 132 form a sturdy rectangular shaped support frame for chair 100.

Figure 3:
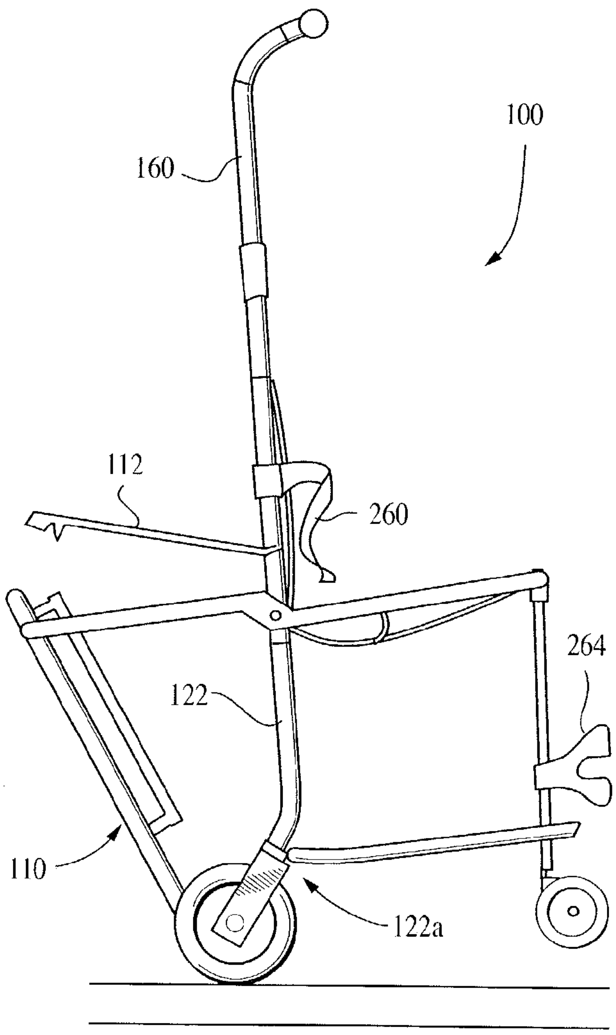
FIG. 3 is a side view of the chair of FIG. 1.

With particular reference to FIGS. 1 and 3, the lower ends of legs 120 and 122 bend backwards, as shown at 122*a*, preferably at an angle between 120° and 140°. This rearward bend of legs 120 and 122 is of significant utility because it substantially improves the stability of the chair 100. To elaborate, as a result of the backward bend in these legs, wheels 134 are located rearward of where they otherwise would be. This reduces—and, as a practical matter, may practically eliminate—the risk that the center of gravity of a person seated in the chair 100 might shift rearward of wheels 134 and thus cause the chair to tip over backwards. Because of this, among other advantages, a person may be seated in the chair with the assistance of only one other person, and hence only one person is needed to open or erect the chair, to place another person in that chair, and then to transport the chair down stairs.

Connecting members 126 and 130 are securely mounted to upper ends of legs 120 and 122, and these connecting members are used to support and to connect upper frame section 112 to main frame 102. For example, ends of the connecting members preferably include a pair of parallel, connected sleeves or tubular portions 186 and 188. In use, one sleeve of each connecting member is rigidly mounted on the top of a respective one of the legs 120, 122 of main frame 102, and one of the legs 140, 142 of upper frame section 112 is inserted into the other sleeve of the connecting member. As particularly shown in FIGS. 1 and 4, upper cross member 132 is rigidly secured to and extends between connecting members 126 and 130.

Seating assembly 104 is pivotally connected to main frame 102 for pivotal movement between a closed or folded position and an open or unfolded position. In the closed position, shown in FIG. 2, the left and right members 140 and 142 of the seating assembly extend generally parallel and closely adjacent to main frame 102; and in the unfolded position, the left and right members 140 and 142 of the seating assembly extend away from the main frame, generally perpendicular thereto.

More specifically, left seat member 140 is pivotally connected to left leg 120 of mainframe 102, and this seat member extends both rearwardly and forwardly of leg 120. Similarly, right seat member 142 is pivotally connected to right leg 122 of main frame 102 and extends both rearwardly and forwardly of leg 122. Seat member 144 is connected to and laterally extends between forward portions of seat members 140 and 142. Preferably, seat member 144 and the forward portions of seat members 140 and 142 are integrally connected together and formed from a single elongated tubular element that is bent into a U-shape to form these seat members.

In reference to seat 146, there is a cross bar in sleeve of seat 146 to connect to cross member 132, and a cross bar in sleeve of seat 146 to connect right behind seat member 144. As seating assembly 104 is pivoted into its unfolded or open position, sheet 146 is pulled open to form a seat for a person.

Each of the lateral rail assemblies 106 and 110 is also pivotally connected to main frame 102 of chair 100 for pivotal movement between folded or closed and unfolded or open positions. In the folded or closed position, shown in FIG. 2, the rail assemblies extend upward from a lower portion of main frame 102, generally parallel thereto; and in the unfolded or open position, shown in FIGS. 1, 3 and 4, the rail assemblies extend upward and rearward from the lower portion of the main frame 102. Moreover, preferably, the rail assemblies 106 and 110 are also connected to seating assembly 104 so that as the seating assembly is pivoted between its closed and open positions, the rail assemblies are automatically moved between their closed and open positions.

Figure 4:
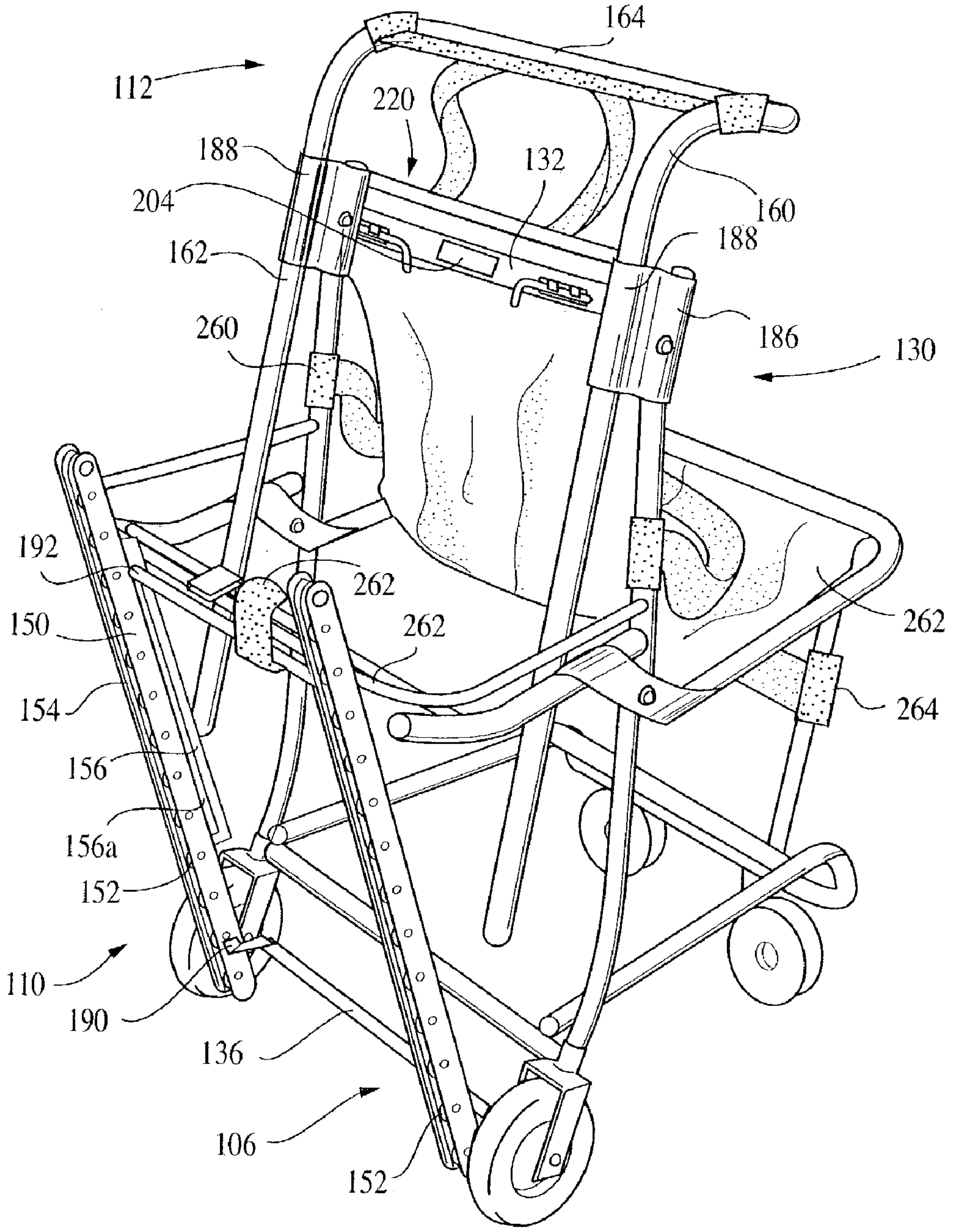
FIG. 4 shows the rail assemblies of the chair.

The two rail assemblies 106 and 110 are substantially identical, and thus only one will be described in detail. With particular reference to FIGS. 1, 3 and 4, rail member 150 of rail assembly 110 is pivotally connected to shaft 136 via a suitable bracket 190 and extends upward from this bracket. Rollers 152 are rotatably mounted on rail member 150, and these rollers are arranged in a linear sequence or path on the rail member. Belt 154 is mounted on the rollers 152 and is supported by the rollers for movement around an endless path defined by the rollers.

Flange 156 is connected to the rail member 150, and this flange forms an elongated groove 156*a* that is used to help move rail assembly 110 between its closed and open positions. More specifically, cross bar 192 extends through the two grooves 156*a* in the two flanges 156 of the two rail assemblies 106 and 110, and the two ends of this cross bar are rigidly secured to the back ends of members 140 and 142 of seating assembly 104. Thus, cross bar 192 pivots with the back ends of members 140 and 142 as seating assembly 104 pivots between its open and closed positions. With particular reference to FIGS. 1 and 4, as bar 192 swings downward and inward, the bar engages the surfaces of flanges 156 that form grooves 156*a* and pulls the rail assemblies 106 and 110 toward main frame 102 and into the folded or closed position of the rail assemblies. Conversely, as seating assembly 104 pivots from the closed position into the open position, bar 192 swings upward and outward, and this cross bar pushes rail assemblies 106 and 110 outward and into their open positions.

Figure 5:
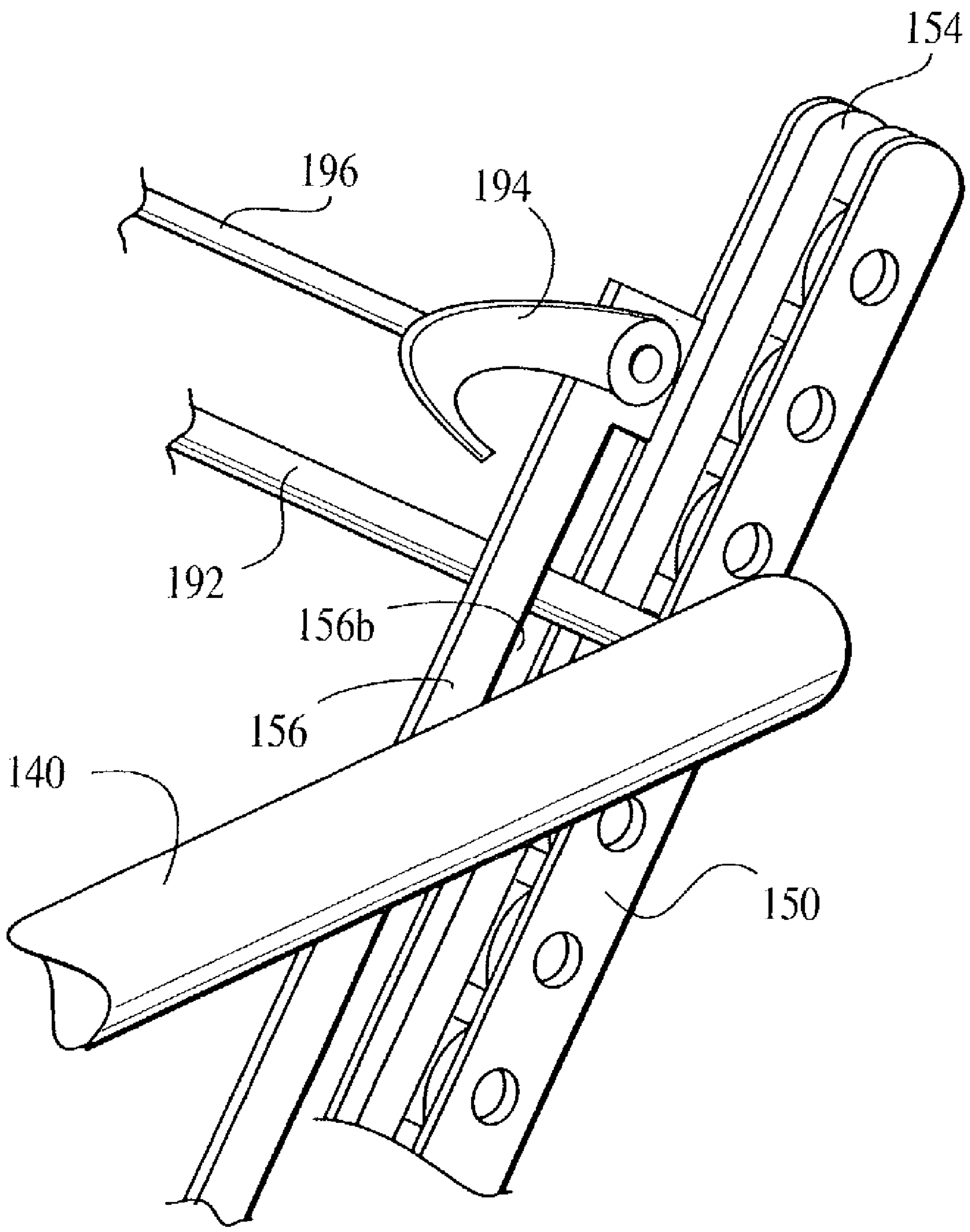
FIG. 5 is an enlarged view of a portion of one of the rail assemblies.

As shown in FIG. 5, preferably, a hook 194 is provided adjacent the top of each groove 156*a* to hold cross bar 192 at the tops of those grooves. More specifically, hooks 194 are pivotally mounted on flanges 156; and when the rail assemblies are in the open positions, hooks 194 can be swung over cross bar 192 such that the hooks engage the cross bar and hold the cross bar in a comparatively fixed position, between the hook and the top of groove 156*a*. To release bar 192 from hooks 194, to allow the cross bar to slide down grooves 156*a*, the bottom portions of the hooks are pivoted away from the cross bar, clockwise as viewed in FIG. 5. A connecting bar 196 may be connected to both hooks 194 to facilitate pivoting the hooks. A second safety is a Velcro strap that provides locking the bar 196 to cross bar 192 in FIG. 5 to bar 202 in FIGS. 6 and 7. All three are wrapped by safety Velcro straps 198.

Figure 6:
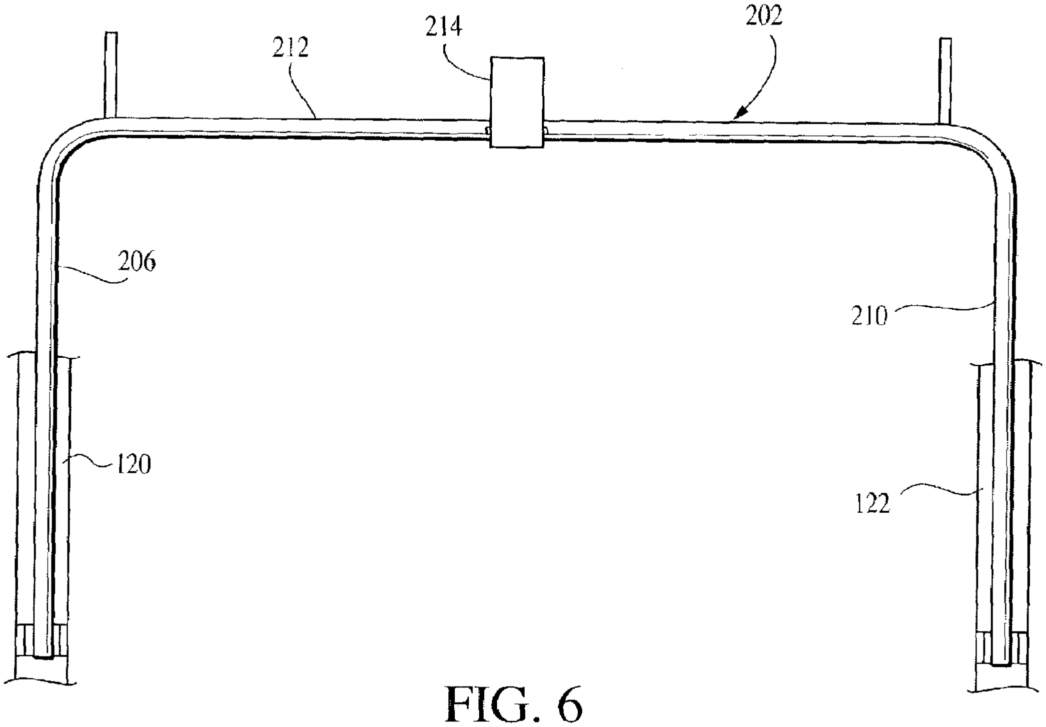
FIGS. 6 and 7 illustrate a locking bar of the chair.
Figure 7:
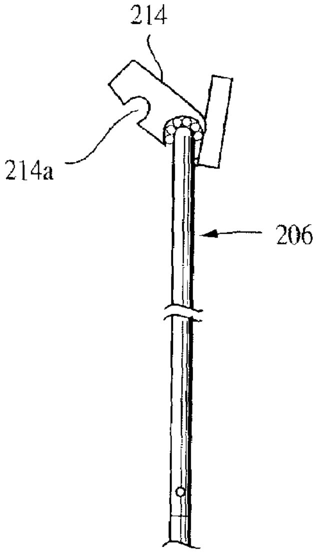

With particular reference to FIGS. 4, 6 and 7, a locking bar 202 may be provided to help lock the rail assemblies 106 and 110, as well as the seating assembly 104, in their open positions. Generally, locking bar 202 is connected to main frame 102 for movement between engaged and disengaged positions. In the engaged position, the locking bar engages seating assembly 104 to help lock the seating assembly and rail assemblies 106 and 110 in the open position; and in the disengaged position, the locking bar is disengaged from the seating assembly. Preferably, in the engaged position, locking bar 202 extends over and engages cross bar 192 to help lock the seating assembly and the rail assemblies in their open positions. Also, preferably, retaining magnet 204 is mounted on main frame 102, specifically, cross member 132, to hold the locking bar releasably in the disengaged position.

More specifically, with the preferred embodiment of chair 100 shown in the drawings, locking bar 202 includes side legs 206 and 210, cross or lateral leg 212 and locking piece 214. Legs 206 and 210 are pivotally connected to and extend from main frame 102. For example, legs 206 and 210 may be connected to left and right legs 120 and 122, respectively, of the main frame via suitable brackets and slightly above side members 140 and 142 of seating assembly 104. Cross leg 212 is connected to and extends between outward ends of legs 206 and 210. Legs 206, 210 and 212 may be connected together in any suitable way; and for instance, these legs may be integrally connected together and formed from a single metal rod that is bent into a u-shape. Locking piece 214 is mounted on cross leg 212 for pivotal movement therewith, and piece 214 forms an outwardly facing notch 214*a*. When the locking bar 202 is in the engaged position, cross bar 192 is received in notch 214*a*, and the locking piece 214 helps lock the cross bar in place.

With reference again to FIGS. 1–4, upper frame section 112 is connected to and is supported by main frame 102 for movement between retracted and extended positions. Also, the upper frame section 112 can be connected to the main frame so that frame section 112 either faces forward or faces backward. With the preferred embodiment of chair 100 shown in the drawings, when upper frame section 112 is in its extended position, (shown in FIGS. 1, 2 and 3), the upper frame section extends upwards from the top end of main frame 102, generally parallel thereto; and when upper frame section 112 is in its retracted position (shown in FIG. 4), the upper frame section extends generally downward from the top end of main frame 102, generally rearward of the main frame. Also, the upper frame section is considered to face forward when cross member 164 is forward of legs 160 and 162, as shown in FIGS. 1–4; and, conversely, the upper frame section is considered to face backwards when member 164 is rearward of legs 160 and 162.

More particularly, legs 160 and 162 of upper frame section 112 are substantially straight, although, as viewed in FIGS. 1–4, the upper portion of each of these legs curves upwardly forwardly slightly, and upper cross member 164 is connected to and extends between the upper ends of legs 160 and 162. In addition, legs 160 and 162 are substantially parallel to each other and are spaced apart slightly less than the distance between legs 120 and 122 of main frame 102. Legs 160 and 162 and cross member 164 may be connected together in any suitable manner. For example, cross member 164 may be welded to top ends of legs 160 and 162.

With particular reference to FIGS. 1, 3 and 4, upper frame section 112 is connected to main frame 102 by inserting the bottom ends of legs 160 and 162 into sleeves 188 of connecting members 126 and 130. The sizes of sleeves 188 and legs 160 and 162 are selected so that these legs will slide up and down through these sleeves, allowing the upper frame section 112 to move between its extended and retracted positions.

Figure 8:
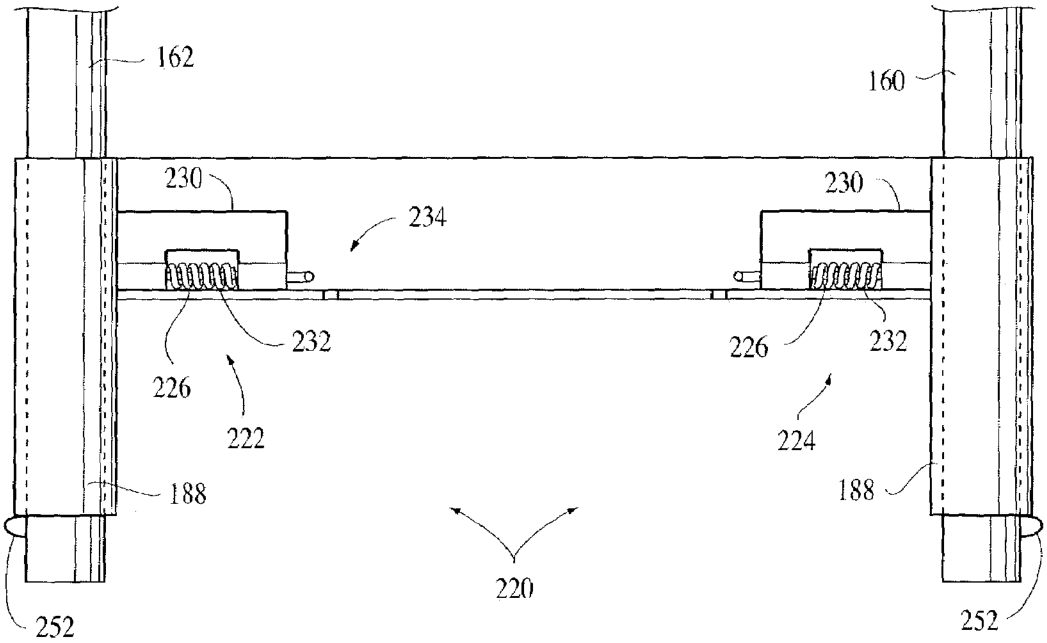
FIG. 8 shows a latching assembly of the chair.
Figure 9:
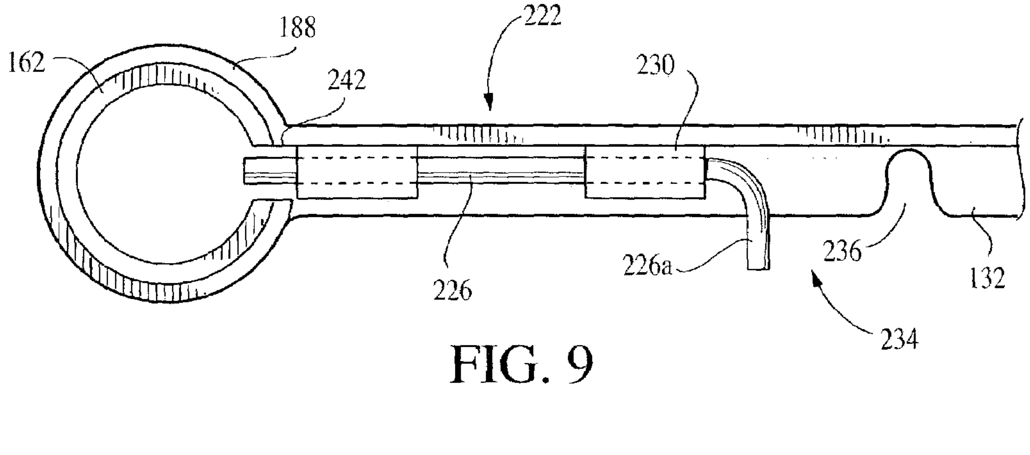
FIG. 9 is an enlarged view of one of the latches of the latching assembly.

With reference to FIGS. 4, 8 and 9, latching assembly 220 is provided to hold legs 160 and 162—and thus upper frame section 112—in place relative to main frame 102. Preferably, latching assembly 220 is used to hold upper frame section 112 in all of its various positions. Extended forward position is for transporting a person down stairs. Backward lower position is for carrying a person up stairs.

Preferably, latching assembly 220 includes substantially identical left and right subassemblies 222 and 224. Each subassembly includes latch 226, bracket 230*i* and biasing means such as spring 232. Generally, latch 226 is mounted on main frame 104 for sliding movement between engaged and disengaged positions. In the engaged position, the latch 226 engages upper frame section 112 and holds that frame section in place. In the disengaged position, the latch 226 is not engaged with upper frame section 112, and that frame section is moveable between the retracted, extended, forwardly facing and rearwardly facing positions. Spring 232 engages latch 226 and urges the latch into its engaged position.

Preferably, each latch subassembly further includes means, generally referenced at 234, for holding latch 226 in the disengaged position, against the urging of spring 232. With the embodiment of latch assembly 222 shown in FIGS. 8 and 9, this holding means 234 includes an end portion 226*a* of latch 226 and an adjacent retaining slot 236 formed in cross member 132 of main frame 102. More specifically, latch 226 includes a straight, main portion and a bent-end portion 226*a*. To hold latch 226 in the disengaged position, the latch is pulled to the right, as viewed in FIG. 9, against the force of spring 232, and the latch is turned to swing bent portion 226*a* into slot 236. The physical engagement between bent portion 226*a* and the surface of member 132 that forms slot 236 prevents the latch from sliding back to the left. Latch 226 can be returned to the engaged position by swinging bent portion 226*a* out of retaining slot 236, and allowing spring 232 to force the latch to the left.

Figure 10:
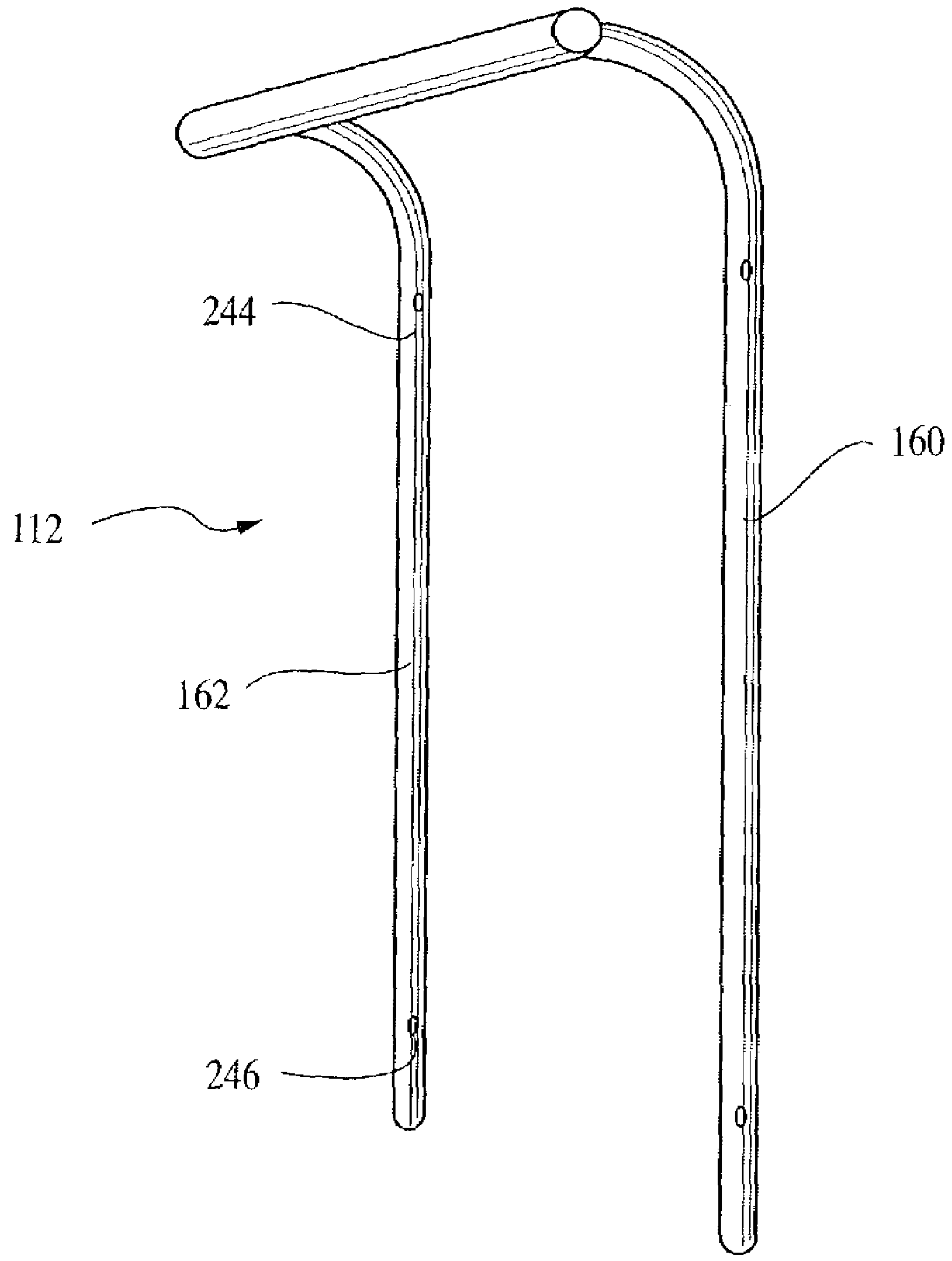
FIG. 10 illustrates an upper frame section of the chair.
Figure 14:
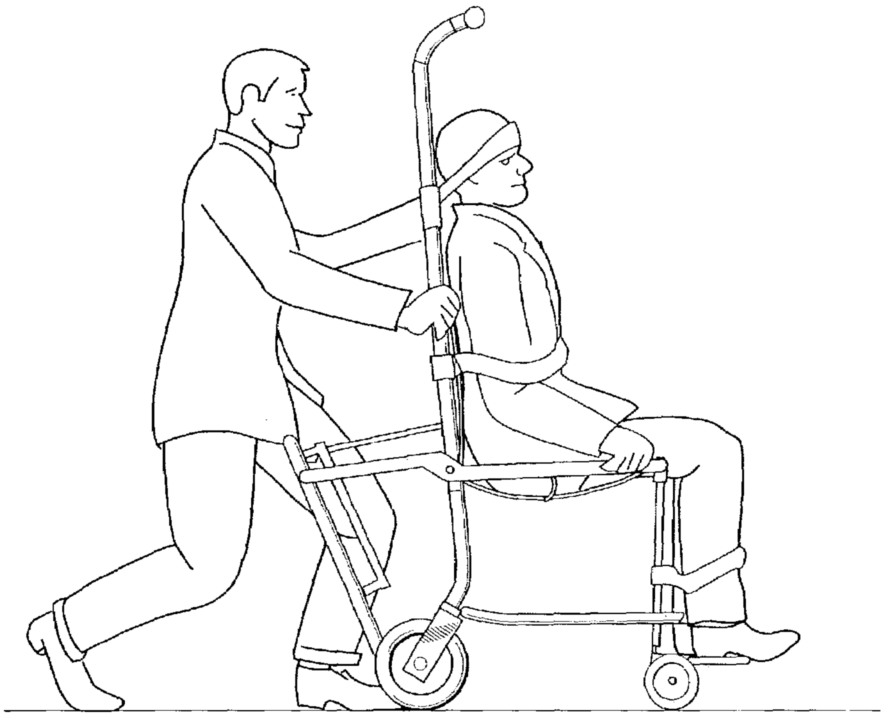

Preferably, as shown in FIG. 9, latch 226 is slidably mounted on cross member 132 of main frame 102 by means of bracket 230, immediately to the side of connecting sleeve 188. The sidewall of that connecting sleeve forms a through, side opening 242, allowing latch 226 to slide into the sleeve. Also, the sidewall of each leg 160, 162 of upper frame section 112 forms two side openings, an upper opening and a lower opening. FIG. 10 shows these upper and lower openings of leg 162 at 244 and 246 respectively. These upper openings in legs 160 and 162 are used to hold frame section 112 in the retracted position, while the lower openings are used to hold frame section 112 in the extended position.

To put frame section 112 in the retracted position, legs 160 and 162 are slid downward through sleeves 188 so that the upper leg openings 244 are aligned with sleeve openings 242, and then latches 226 are slid, under the bias of springs 232, into and through openings 242 and 244, locking the frame section 112 in place. To put frame section 112 in the extended position, latches 226 are pulled out of openings 242 and 244, frame legs 160 and 162 are raised to align lower openings 246 with sleeve openings 242, and then latches 226 are slid through the aligned leg and sleeve openings to lock the legs 160, and 162 in place. Preferably, it may be noted,. spring biased stop buttons, shown for example at 252 in FIG. 8, are mounted on legs 160 and 162 to limit upward and downward movement of those legs. When desired, an operator can press these buttons 252 inwards, into the legs, to allow the buttons, and the connected legs, to slide through sleeves 188.

As mentioned above, front support assembly 114 includes legs 166 and 170 and bottom subframe 174. Support legs 166 and 170 are pivotally connected to and extend downward from seating assembly 104, to help support the seating assembly and to help position the legs of an occupant of the chair. Bottom subframe 174 is pivotally connected to main frame 102 and extends forward therefrom, and this subframe 172 includes a laterally extending forward cross member 184 located forward of the support legs 166 and 170. Because of its location, below and forward of the legs 166 and 170 of the chair occupant, cross member 184 forms an effective gripping bar for a person to grip the chair to help carry the chair upstairs.

This is of significant importance because it substantially facilitates using the chair 100 to carry a person upstairs. This, in turn, is very advantageous because, as a result, the same chair 100 may be easily and readily used both for carrying people upstairs and for transporting people downstairs.

More specifically, the preferred embodiment of subframe 174 includes left and right members 176 and 180 and cross members 182 and 184. Left and right members 176 and 180 are pivotally connected to left and right legs 120 and 122 of main frame 104, and members 176 and 180 extend forward from legs 120 and 122. Cross member 182 is connected to and laterally extends between intermediate portions of members 176 and 180. Front portions of members 176 and 180 curve forwardly downwardly, and front cross member 184 is connected to and laterally extends between the forward ends of members 176 and 180. Members 176, 180 and 184 of subframe 174 may be connected together in any suitable way. Preferably, members 176, 180 and 184 are integrally connected together, and for instance, these members may be made from a single, tubular member that is bent into a U-shape. Cross member 182 may be welded to side members 176 and 180.

Front legs 166 and 170 of assembly 114, in addition to being pivotally connected to cross member 144 of seating assembly 104, also extend forward of cross member 182 of subframe 174 and are pivotally connected to that cross member via brackets. Wheels 172 are connected to front legs 166 and 170, both for rotational movement and for swiveling movement about the axes of those legs.

Figure 2:
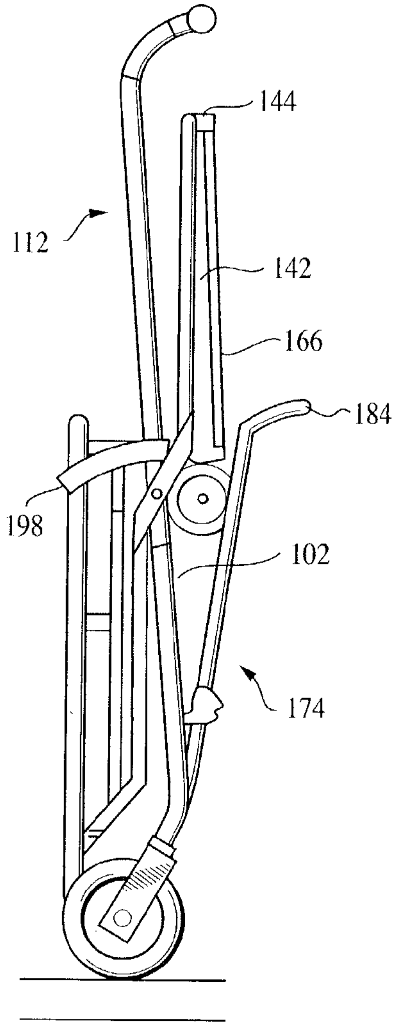
FIG. 2 shows the chair in its collapsed position.

With the above-described arrangement, as seating assembly 104 pivots into its folded position, subframe 174 of support assembly 114 swings upward, generally about cross member 124, and front legs 166 and 170 move upward and inward, pivoting relative to member 144 and relative to subframe 172. With reference to FIG. 2, in the collapsed position of chair 100, front legs 166 and 170 of front support assembly 114 extend substantially downward from seating assembly member 144 and subframe 174 extends substantially upward from lower back cross member 124.

Harness system 116 is provided to help secure a person in chair 100; and this system includes left and right belt sections 260 and 262, leg strap 264 and head band 266. Left and right belt sections 260 and 262 are respectively mounted on legs 120 and 122 of main frame 102; and preferably these belt sections can be slid up and down along those legs, allowing the position of the belt sections to be adjusted. For example, ends of belt sections 260 and 262 may form loops that are mounted on or wrapped around legs 120 and 122. These belt sections may be connected together in any suitable way, such as by means of a Velcro fastener. Also, rear safety Velcro strap to hold 192, 196 and 202 in lock positions when, chair is open.

Leg strap 264 is mounted on one of the legs 166, 170 of front support assembly 114. In use, strap 264 is wrapped around the other of the legs 166, 170 of front support assembly 114 and around the legs of a person seated in the chair, and the two ends of the strap are connected together to form a secure loop holding the legs of the person between legs 166 and 170 of chair. Strap 264 may be mounted on leg 166 in any suitable way, and preferably the strap can be slid up and down along that leg. For instance, one end of strap 264 may form a loop that is mounted on or wrapped around leg 166. Further, the two ends of leg strap 264 may be connected together in any suitable manner, for example by means of a Velcro fastener.

Head band 266 is provided to help hold the head of a person seated in chair 100, and preferably, the head band includes back and front sections 270 and 272. Back section 270 is mounted on and extends between legs 160 and 162 of upper frame section 120, the center of front section 272 is connected to back section 270, and the two ends of section 272 may be releasably connected together, for example by a Velcro fastener. In use, a person who is seated in chair 100 places his or her head against sections 270 and 272, and the ends of front section 272 are wrapped around and against the forehead of that person and then connected to each other.

Although the operation of chair 100 is apparent from a review of the above discussion, that operation will now be summarized. This operation is specifically illustrated in FIGS. 11–21, and as shown therein, an important advantage of this chair is that the same chair can readily and easily be used to transport people both upstairs and downstairs.

More specifically, as shown in FIG. 11, chair 100 may be stored in its compact, collapsed position, and the chair may be fully opened, as shown in FIG. 12 by means of a simple procedure. In particular, to open the chair, seating assembly 104 is pulled into its open, erect position, and upper frame section 112 is pulled upward and locked into its extended position. When seating assembly 104 is pulled into its opened position, front support assembly 114 and rail assemblies 106 and 110 are automatically moved into their open or operating positions and wrapping a safety Velcro strap around bars 192, 196 and 202.

Figure 15:
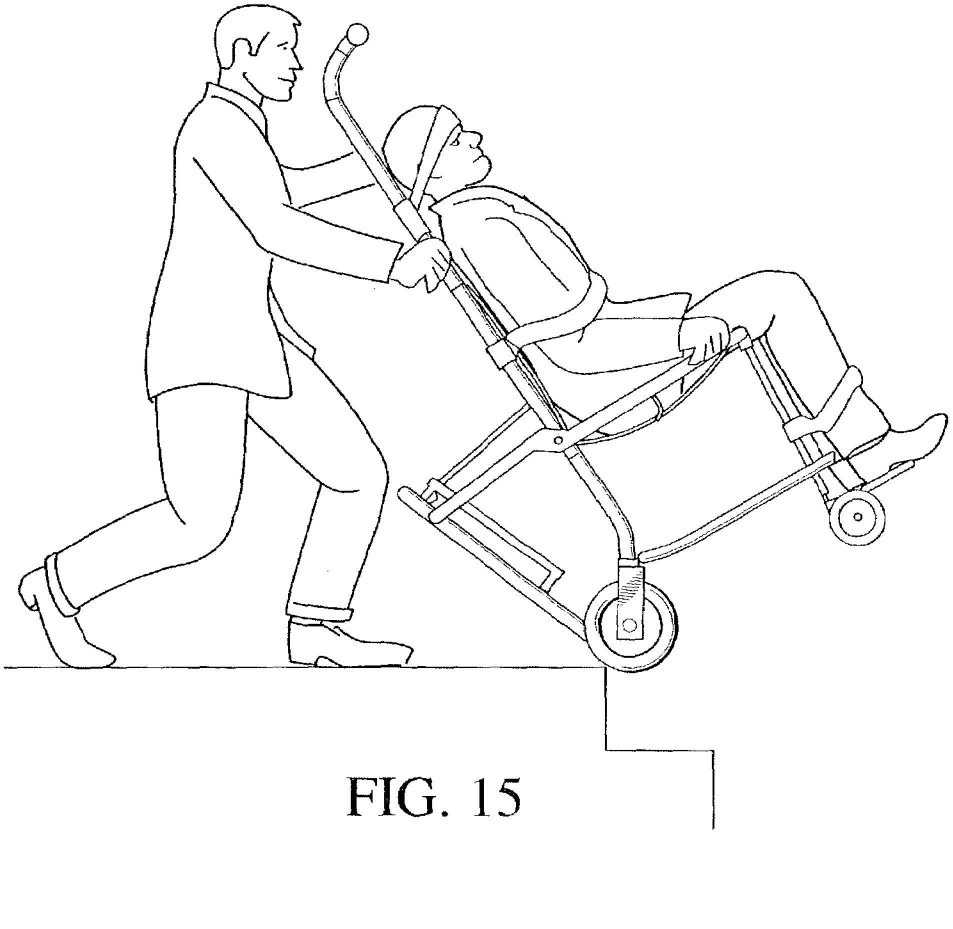
Figure 16:
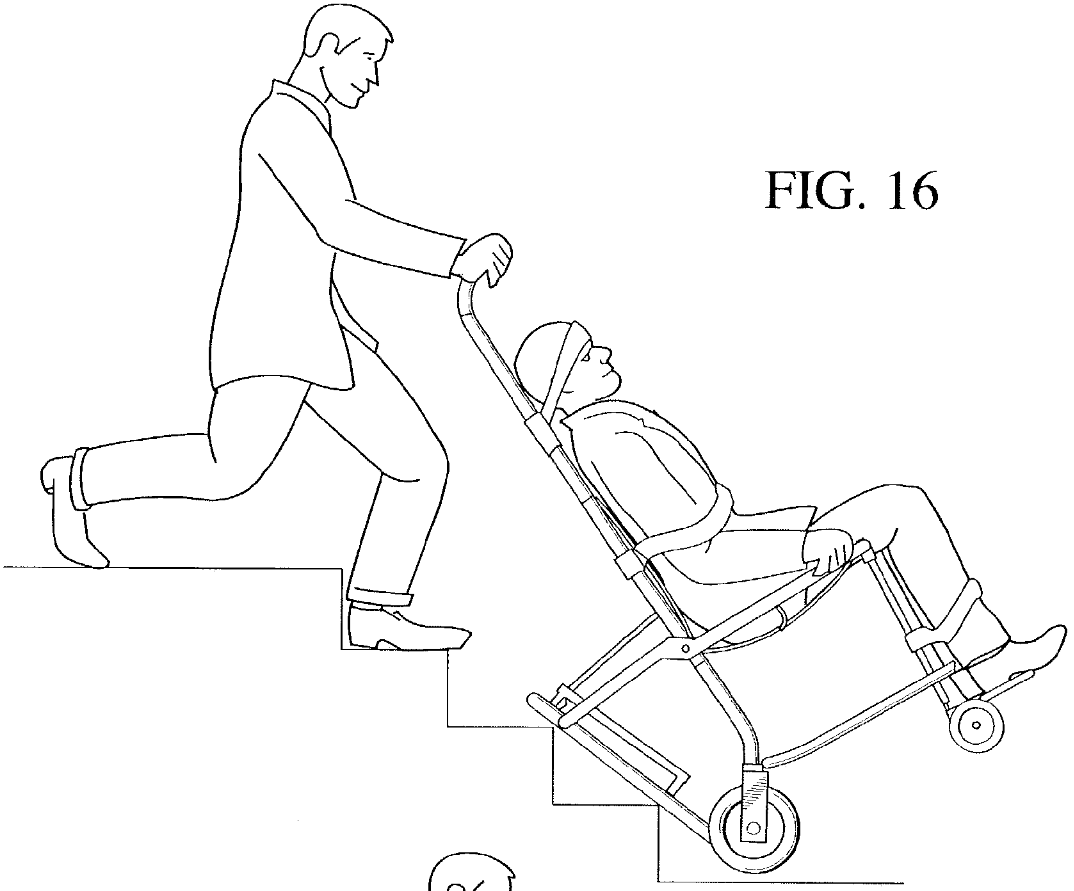
Figure 17:
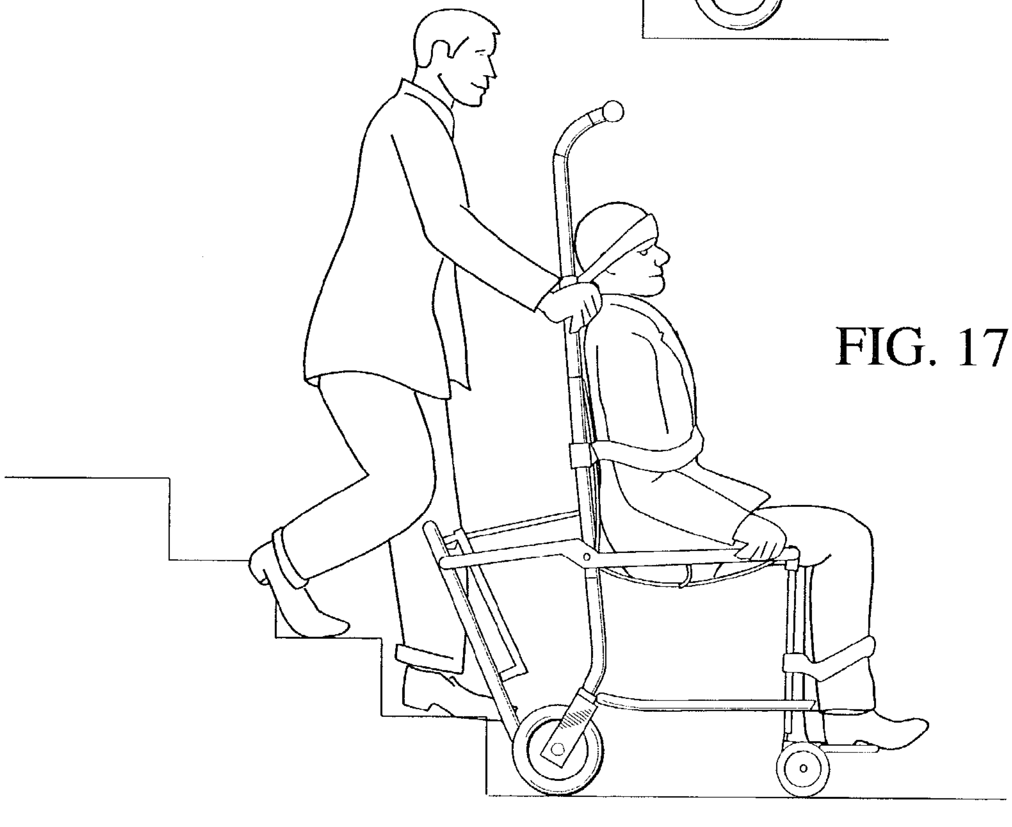

Once chair 100 is opened, a person may be seated in the chair, as shown in FIG. 13. Then, with reference to FIG. 14, belt sections 260 and 262 may be connected together across the lap of that person, belt strap 264 may be looped around the legs of the chair occupant, and head band 266 may be connected around the forehead of that person. When the chair is moved over a flat, or comparatively flat, surface, the chair is supported by wheels 134 and 172. When the chair is moved down stairs, as illustrated in FIGS. 15 and 16, the chair is supported by the lateral rail assemblies 106 and 110, which engage and extend across the top edges of those stairs.

Figure 18:
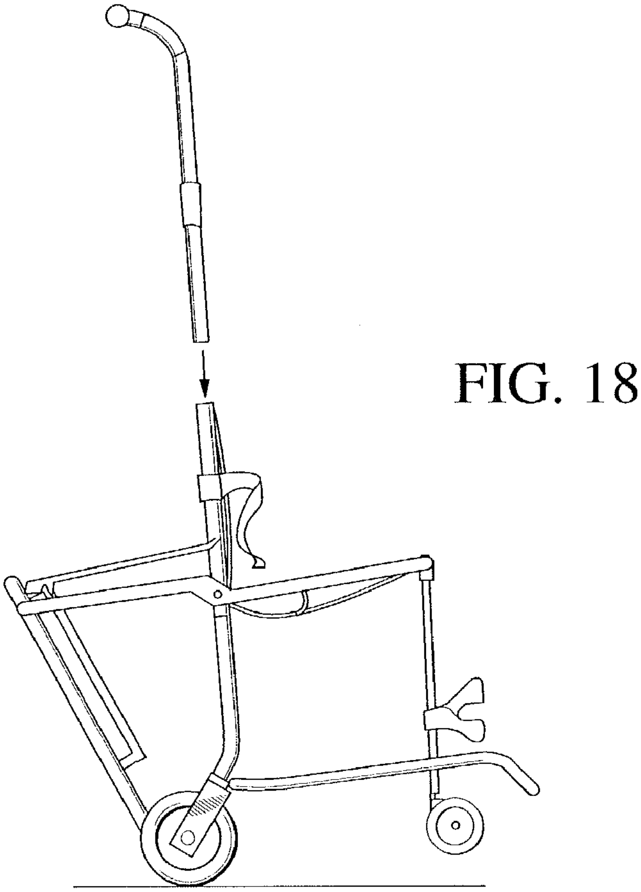
Figure 19:
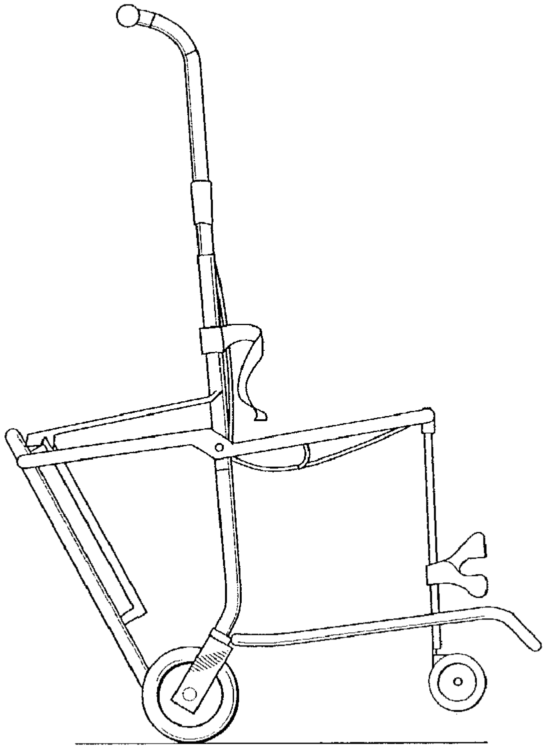
Figure 20:
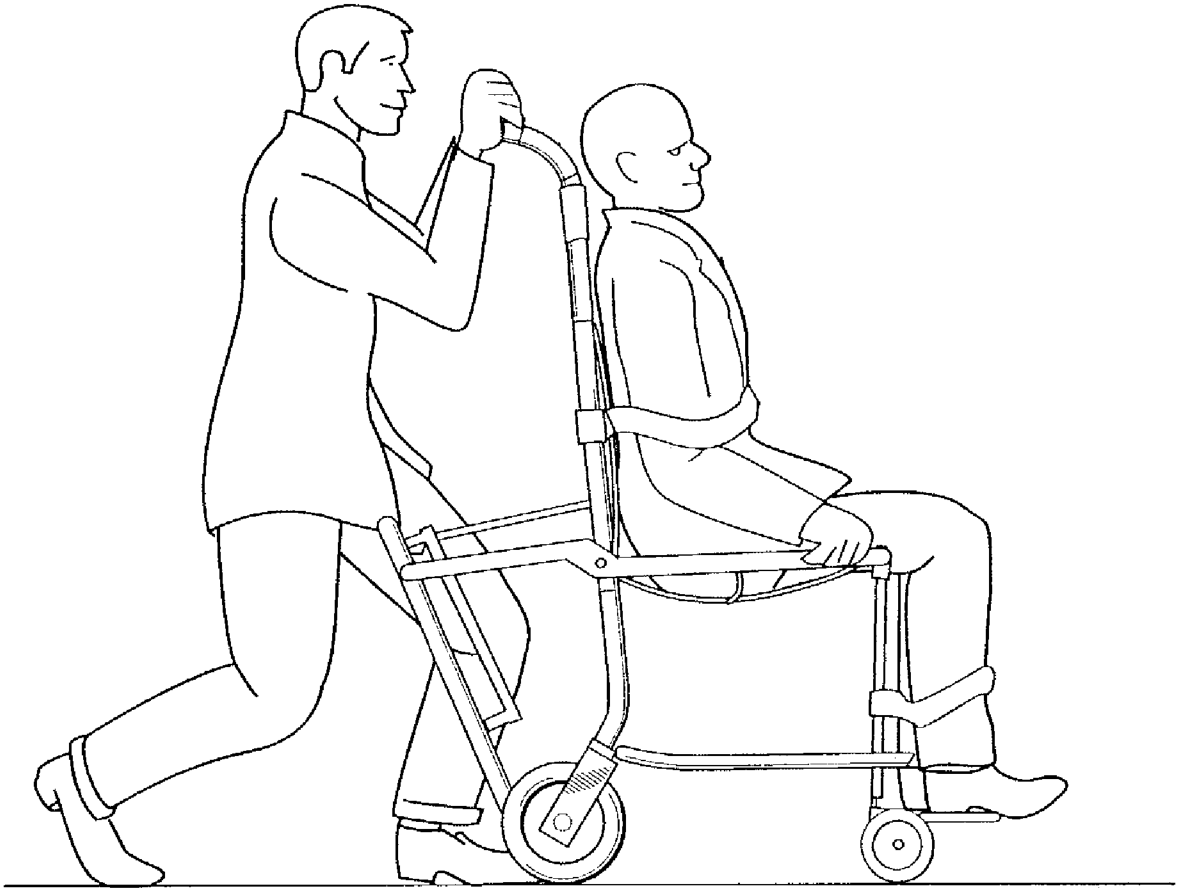
Figure 21:
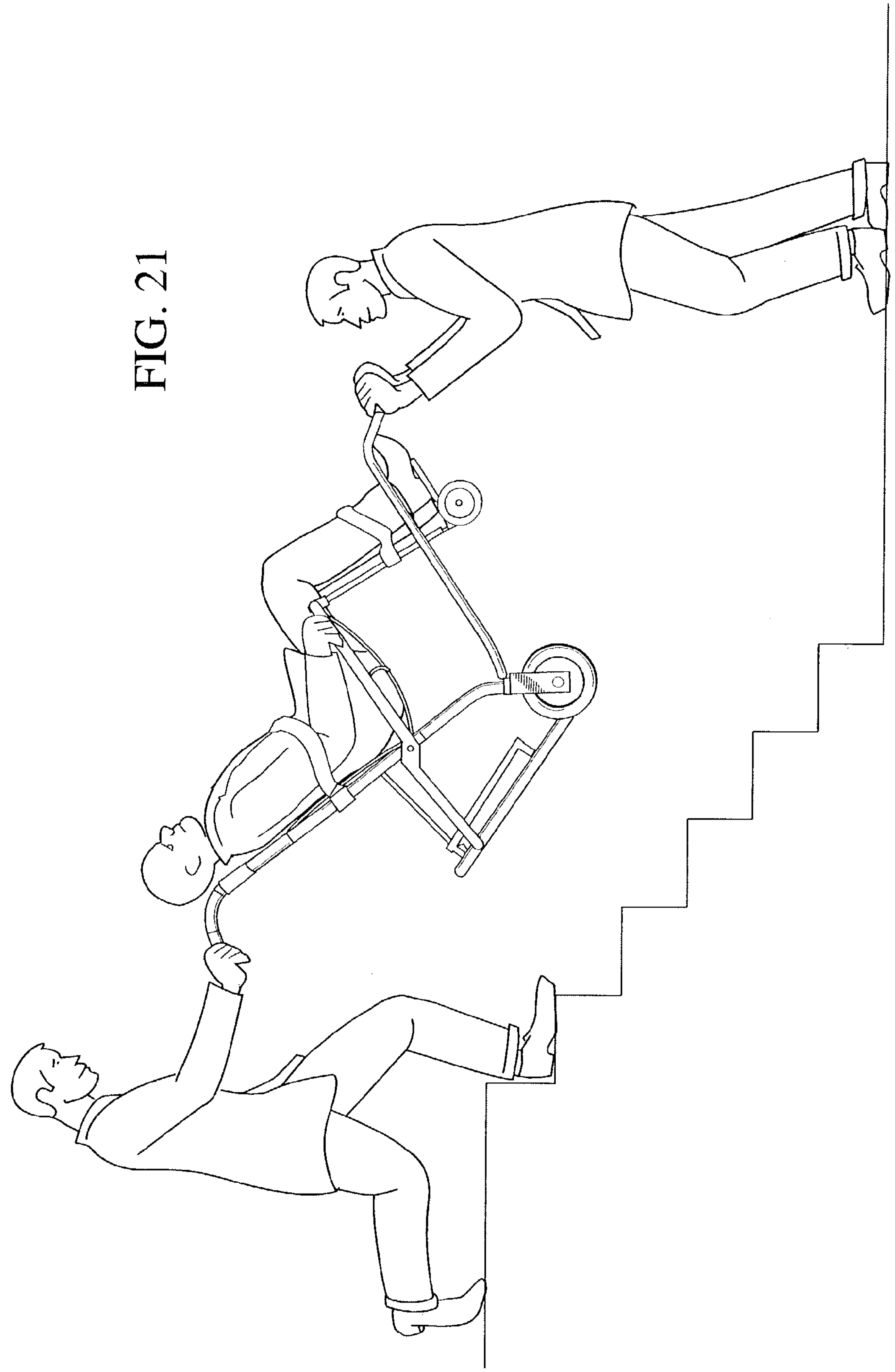

To use chair 100 to carry a person upstairs, upper frame section 112 is secured in the backwardly facing position, as shown in FIGS. 18 and 19, and a person is secured in the chair, as illustrated in FIG. 20. Two people are used to carry the chair upstairs, as shown in FIG. 21, with one person holding the chair via upper cross member 164 and with the second person holding the chair via lower front cross member 184.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

The invention claimed is:

1. A collapsible chair for transporting people up and down stairs, the chair comprising:

a main frame;

a seating assembly pivotally connected to the main frame for pivotal movement between open and closed positions;

a pair of wheels rotatable mounted on the main frame to support the chair for movement over a surface;

a rail assembly to support the chair for movement down stairs, and pivotally connected to the main frame for pivotal movement between open and closed positions;

an upper frame section connected to and supported by the main frame, wherein the upper frame section has retracted and extended positions, and has forwardly facing and rearwardly facing positions; and a latching assembly operative to releasably secure the upper frame section in the retracted, extended, forwardly facing and rearwardly facing positions.

2. A collapsible chair according to claim 1, wherein the latching assembly further includes means for holding the latch in the disengaged position, against the urging of a biasing means.

3. A collapsible chair according to claim 2, wherein:

the latch includes an end portion;

the main frame forms a retaining slot;

the holding means includes the end portion of the latch and the retaining slot; the latch is supported for pivotal movement between a first position and a second position;

in the first position, the latch is slidable between the engaged and disengaged positions;

in the second position, the end portion of the latch extends into the retaining slot, and the main frame holds the latch in the second position.

4. A collapsible chair according to claim 3, wherein:

the main frame includes i) left and right support members, and ii) a cross member supported by and positioned between the left and right support members; and the latching assembly is mounted on the cross member.

5. A collapsible chair according to claim 4, wherein:

the upper frame section includes first and second legs supported by the left and right support members of the main frame;

the first leg forms a first side opening;

the second leg forms a second side opening;

in the engaged position, the latching assembly extends into the first and second side openings to hold the first and second legs in place relative to the left and right side members;

in the disengaged position, the latching assembly is disengaged from the first and second side openings, and the first and second legs are moveable relative to the left and right support members.

6. A collapsible chair according to claim 5, wherein:

the latching assembly includes first and second retaining latches;

in the engaged position, the first retaining latch extends into the first side opening to hold the first leg in place, and the second retaining latch extends into the second side opening to hold the second leg in place.

7. A collapsible chair for transporting people down stairs, the chair comprising:

a main frame;

a seating assembly pivotally connected to the main frame for pivotal movement between open and closed positions;

a rail assembly to support the chair for movement down steps, and pivotally connected to the main frame for pivotal movement between open and closed positions;

a pair of wheels rotatably mounted on the main frame to support the chair for movement over a surface;

a locking subassembly for connecting the rail assembly to the seating assembly to lock the rail assembly in the open position thereof;

an upper frame section connected to and supported by the main frame, wherein the upper frame section is configured to be secured in retracted, extended, forwardly facing and rearwardly facing positions; and a locking bar connected to the main frame for movement between engaged and disengaged positions, wherein in the engaged position the locking bar engages the seating assembly to help lock the seating assembly and the rail assembly in the open positions, and in the disengaged position, the locking bar is disengaged from the seating assembly, wherein the locking bar includes i) first and second legs pivotally connected to and extending from the main frame, ii) a cross leg connected to and extending between the first and second legs, iii) a locking piece mounted on the cross leg for pivotal movement therewith, and forming an outwardly facing notch; and when the locking bar is in the engaged position, the cross bar is received in said notch, and the locking piece helps lock the cross bar in place.

8. A collapsible chair according to claim 7, further including a safety strap operative to hold the locking bar in place, and also operative to hold the chair in the folded position.

9. A collapsible chair according to claim 7, further including a retaining magnet mounted on the main frame operative to hold the locking bar releasably in the disengaged position.

10. A collapsible chair for transporting people up and down stairs, the chair comprising:

a main frame;

a seating assembly pivotally connected to the main frame for pivotal movement between open and closed positions;

a rail assembly to support the chair for movement down steps, and pivotally connected to the main frame for pivotal movement between open and closed positions;

a pair of wheels rotatable mounted on the main frame to support the chair for movement over a surface; and a front support assembly to help support the seating assembly, and including i) first and second support legs pivotally connected to and extending downward from the seating assembly, to help support the seating assembly and to help position the legs of an occupant of the chair, and ii) a bottom subframe pivotally connected to the main frame and extending forward therefrom, and including a laterally extending forward cross member located forward of the first and second support legs, to form a gripping bar, below and forward of the legs of the occupant of the chair, for a person to grip the chair to help carry the chair upstairs.

11. A collapsible chair according to claim 10, further comprising a strap mounted on the first support leg, and adapted to wrap around the second support leg and the legs of the occupant of the chair, to hold the legs of the occupant securely in place adjacent the support legs and rearward of the forward cross member.

12. A collapsible chair according to claim 10, wherein:

the bottom subframe further includes left and right side members pivotally connected to and extending forward from left and right sides, respectively, of the main frame;

each of the side members includes forwardly downwardly extending front portions; and the forward cross member is connected to and laterally extends between said front portions.

13. A collapsible chair according to claim 12, wherein the left and right legs are pivotally connected to the bottom subframe.

* * * * *